UNITED STATES PATENT OFFICE.

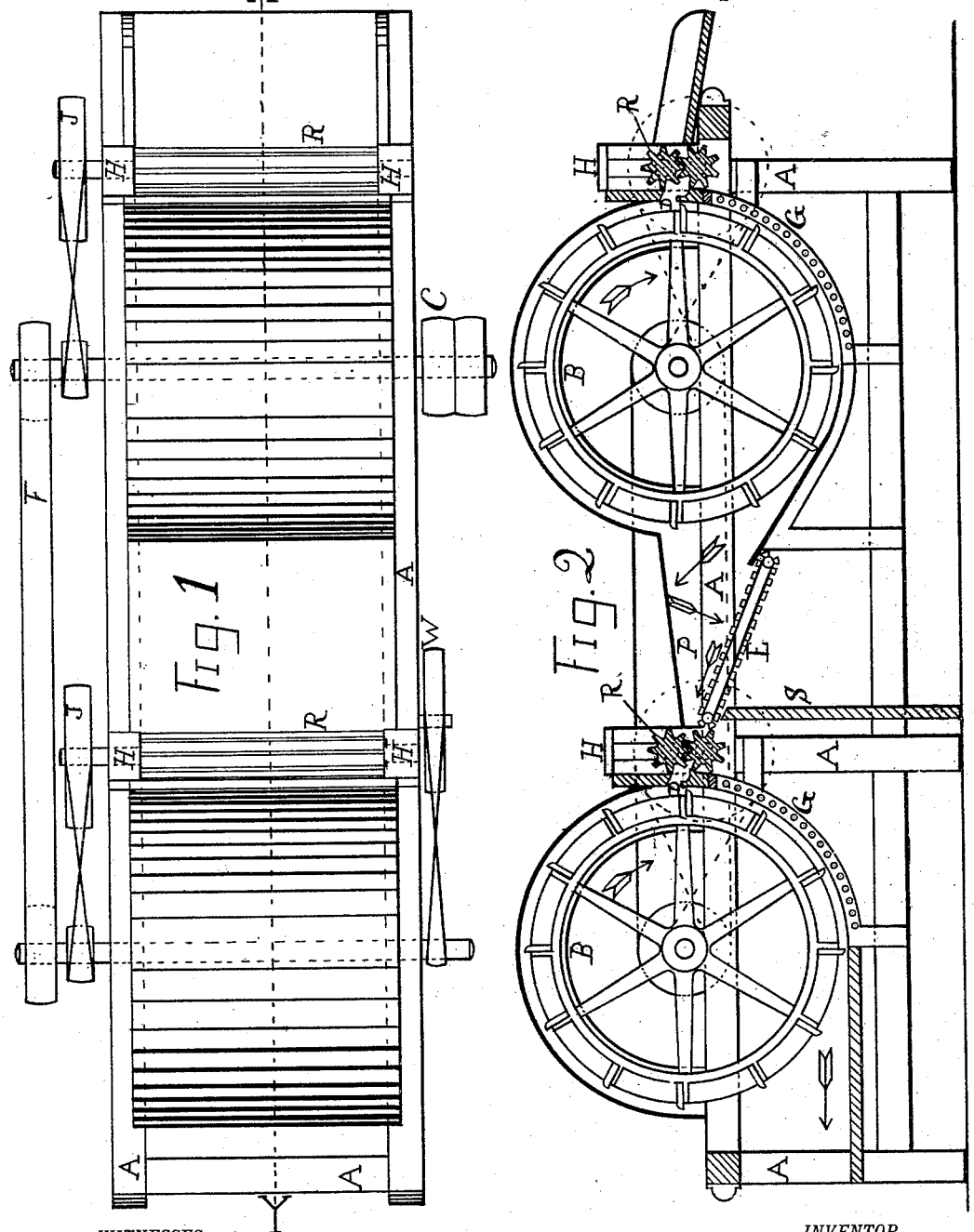

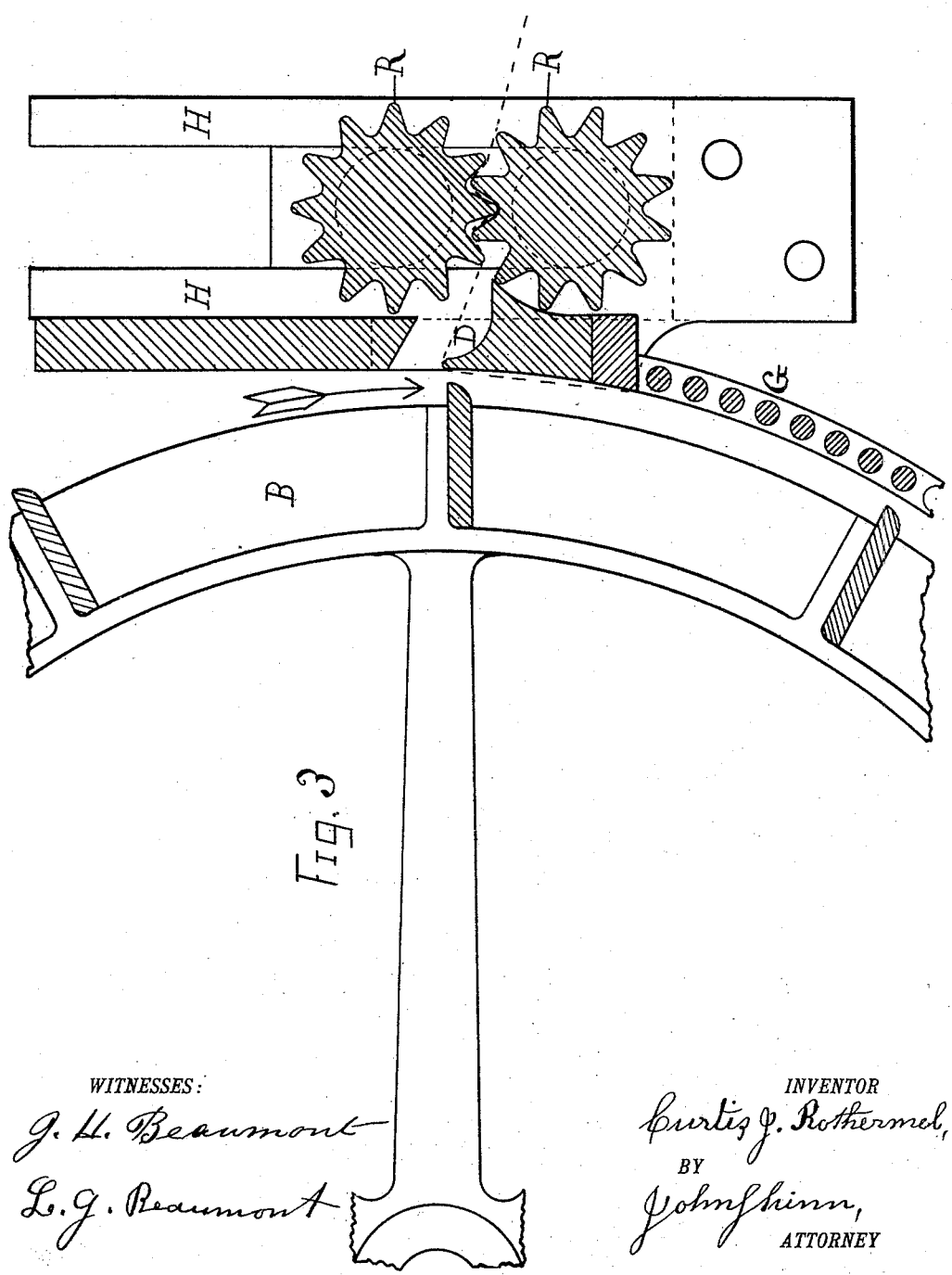

CURTIS J. ROTHERMEL, OF PHILADELPHIA, PENNSYLVANIA, ASSIGNOR TO WILLIAM C. DREYER, TRUSTEE, OF NEW YORK, N. Y.

MACHINE FOR DECORTICATING VEGETABLE FIBERS.

SPECIFICATION forming part of Letters Patent No. 460,286, dated September 29, 1891.

Application filed August 4, 1890. Serial No. 361,000. (No model.)

*To all whom it may concern:*

Be it known that I, CURTIS J. ROTHERMEL, a citizen of the United States, residing at Philadelphia, county of Philadelphia, and State of Pennsylvania, have invented certain new and useful Improvements in Machines for Decorticating Vegetable Fibers, of which the following is a specification.

My invention has for its object to construct a machine for breaking and scutching flax, hemp, and other like vegetable-fiber straws, which machine may be used for long line or tow; and it consists, first, in the combination of a pair of fluted feeding-rollers and an elevated breaking-bed with a revolving scutching drum or cylinder and a barred grate; second, in the combination and arrangement of feeding-rolls, break-beds, two or more scutching-cylinders and grates, intermediate chute, and carrying-apron, as illustrated in the accompanying drawings, in which—

Figure 1 is a top view of my improved machine operating two cylinders. Fig. 2 is a longitudinal section on the line X Y of Fig. 1. Fig. 3 is a cross-section showing the feeding-rolls, elevated bed, section of the scutching-cylinder, and a section of the barred grate.

Similar letters refer to similar parts throughout the several views.

A represents the frame of the machine, which may be made of wood or iron, and B B the breaking and scutching cylinders. These cylinders I prefer to make of metal thirty inches in diameter, thirty inches wide, and each cylinder with twelve wrought-iron paddles three-eighths of an inch thick, three inches wide, and thirty inches long. The outer edges of the paddles are rounded, as shown in the drawings.

R is the fluted feed-rolls. The first pair I make three and one-half inches in diameter and twelve teeth and the second pair three inches in diameter and twelve teeth.

The drawings, Fig. 2, show a less number of teeth than the preferred number of the given size of rolls. It is understood that the size and number of teeth of the feed-rolls are no part of the invention. If desired, the lower roller may be plain and have no teeth. These rollers are mounted in cast-iron stands H, and are, as usual, provided with gum or other springs, pressing the top roller against the bottom roller.

D is the breaking-bed, which I prefer to cast of steel. That part of the bed where the straws pass over the bed to the cylinder is elevated above the line of feed of the two feed-rollers, as shown in Fig. 3, and substantially in line with the axis of the scutching-cylinder or on the same horizontal plane therewith. The side of the bed which is opposite the feeding-rolls is inclined, so that it will with the side which is adjacent to the scutching-cylinder form an acute angle.

G is the grate. This grate I prefer to make of three-eighths of an inch round cold-rolled bars of iron or steel.

P is the intermediate chute. The bottom of this chute is formed of a traveling endless and slatted apron E.

S is a dividing-partition between the sets of mechanism, dividing the lower part of the machine.

The operations of my improved breaking and scutching machine are as follows: Power is by belt communicated to the machine by the pulley C. This pulley drives the first cylinder. The second cylinder is driven by belt F, Fig. 1. The respective pairs of feed-rolls are driven from the respective cylinder-shafts by the pulleys and belts J. The endless apron E is driven by the belt and pulley W. (See Fig. 1.) The cylinders revolve in direction as indicated by the arrows. The straws are fed by the rollers R over the bed D. The elevated point near the cylinder being above the line of feed of the two feed-rollers will bend the straws more than a right angle, as is shown by the dotted lines in Fig. 3. The shives will be fractured by the sharp bending and the paddles of the cylinder will knock the shives off the fibers and through between the bars of the grate G. The speed of the cylinders should be about three hundred revolutions per minute, which speed will create quite a blast, which will blow the tow and such shives as are not knocked through the first grate into the intermediate chute P, and the tow and shives falling on the slatted apron E the tow will be carried by the apron E and fed by the second pair of rollers to the second scutching-cylinder, which cylinder acts upon the tow to thoroughly clean it from shives. If "long-line" fibers are to be cleaned, the first pair of feed-rollers are driven by an open and a cross belt, as described in United States Patent No. 233,949. By this manner of feed the long line does not leave the hands of the operator. It is only partially fed in the machine from each end of the straws. The tow from the long line will be well cleaned from shives as it leaves the second cylinder.

In some cases it may be desirable to use three cylinders with intermediate chutes and carrying-aprons.

Having as above fully described my invention and the best method of operating the same, what I claim as my invention, and desire to secure by Letters Patent, is—

1. In a machine for decorticating vegetable fibers, the combination, with feeding-rolls, a scutching-cylinder, and a barred grate, of a breaking-bed having its upper surface elevated with respect to the line of feed, as described, substantially in the same horizontal plane as the axis of the scutching-cylinder and having that side which is opposite the feeding-rolls inclined, so that it will with the side which is adjacent to the scutching-cylinder form an acute angle, substantially as specified.

2. The combination, with two scutching-cylinders having arranged in proximity thereto, as described, barred grates, breaking-beds, and feeding-rolls located below the breaking-beds, as described, of an intermediate chute and apron and a vertical partition located between the sets of mechanism, substantially as set forth.

CURTIS J. ROTHERMEL.

Witnesses:
GEO. C. BOWKER,
JOHN SHINN.